United States Patent [19]
Enright

[11] 3,935,736
[45] Feb. 3, 1976

[54] METER SETTER

[76] Inventor: William E. Enright, 11307 Summit St., Kansas City, Mo. 64114

[22] Filed: Aug. 19, 1974

[21] Appl. No.: 498,741

[52] U.S. Cl. ................................................. 73/201
[51] Int. Cl.² ........................................ G01F 15/18
[58] Field of Search .................... 73/201; 248/74 PB

[56] References Cited
UNITED STATES PATENTS

| | | | |
|---|---|---|---|
| 654,615 | 7/1900 | Estill | 73/201 |
| 1,281,332 | 10/1918 | Ford | 73/201 |
| 1,847,606 | 3/1932 | Ford | 73/201 |
| 3,486,531 | 12/1969 | Nalodka | 248/68 |
| 3,506,229 | 4/1970 | McDowell | 73/201 |

FOREIGN PATENTS OR APPLICATIONS

| | | | |
|---|---|---|---|
| 861,929 | 3/1961 | United Kingdom | 248/74 PB |
| 884,124 | 12/1961 | United Kingdom | 248/74 PB |

*Primary Examiner*—James J. Gill
*Assistant Examiner*—Anthony V. Ciarlante
*Attorney, Agent, or Firm*—Fishburn, Gold & Litman

[57] ABSTRACT

A meter supporting and positioning apparatus for use with a public utility meter to facilitate its use and connection into a supply line. The apparatus includes inlet and outlet pipe members with one connecting the meter to a service line and the other pipe member connects with a supply line. the pipe members each have a generally horizontally disposed foot forming portion extending partially under the meter and being adapted for engagement with a support surface. Each of the pipe members also include an upstanding leg forming portion having the meter connected to a free end thereof whereby the meter is spaced above the support surface. A connector engages the two upstanding pipe portions holding same in spaced relation and forms a unitary and rigid support structure. The meter is positioned relative to the feet forming portions so as to have balanced loading to reduce torque applied to the pipe members. A form of the apparatus includes a pipe member for connecting a pressure regulator in series with a meter. The pipe members preferably are of a suitable synthetic resin and compensate for expansion and contraction of the supply line and service lines.

6 Claims, 6 Drawing Figures

METER SETTER

A meter setter is a device used to position and support a meter such as a water meter in an underground chamber and thereby facilitate connection of the meter to a buried fluid supply line. A meter setter positions the meter above the supply line and facilitates reading of the meter while the supply line is buried a sufficient distance underground to prevent freezing, as determined by the local frost line. Meters are generally heavy and must be maintained in an upstanding position to minimize torque applied to the supply line which would have a tendency to loosen the connection between the meter and the supply line. Generally, the meter and the supply line connected thereto are installed in a meter box which is buried underground. Prior art meter setters are expensive, made of scarce material and relatively inefficient. Such setters have allowed undue stresses and strains to be applied to the supply line and have required a number of parts to make a workable structure.

The principal objects of the present invention are to provide a meter setter which uses flow pipe members for supporting and positioning a meter in a meter box and connecting the meter between a supply and service line; to provide such a meter setter wherein portions of the pipe members serve as feet which are engageable with a support surface to support the meter and to prevent same from moving during use; to provide such a meter setter having generally upstanding pipe member portions which form legs extending between the feet forming portions and the meter to maintain the meter in spaced relation from the support surface; to provide such a meter setter with a connecting device engaging portions of the upstanding pipe member portions for securing the pipe members in a unitary and rigid structure forming relationship; to provide such a meter setter wherein the pipe members are of a resilient plastic material whereby the meter setter permits compensation for expansion and contraction of the supply line; to provide such a meter setter which is adapted to have a pressure regulator connected in series with the meter wherein the weight of the meter and regulator are supported in a manner to minimize the amount of torque induced in the connection between the pipe members and the supply line; to provide such a meter setter wherein a crossover conduit connects a regulator and meter in series with the crossover conduit having a portion thereof engageable with the support surface and disposed angularly to the feet forming portions providing biaxial support for the meter and regulator; to provide such a meter setter which requires a minimum of space for setting and which permits access to all fittings necessary to connect meter and regulator thereto; and to provide such a meter setter which is inexpensive and easy to manufacture and well adapted for its intended use.

Other objects and advantages of the present invention will become apparent from the following description taken in connection with the accompanying drawing wherein are set forth by way of illustration and example certain embodiments of the present invention.

Figure 1:
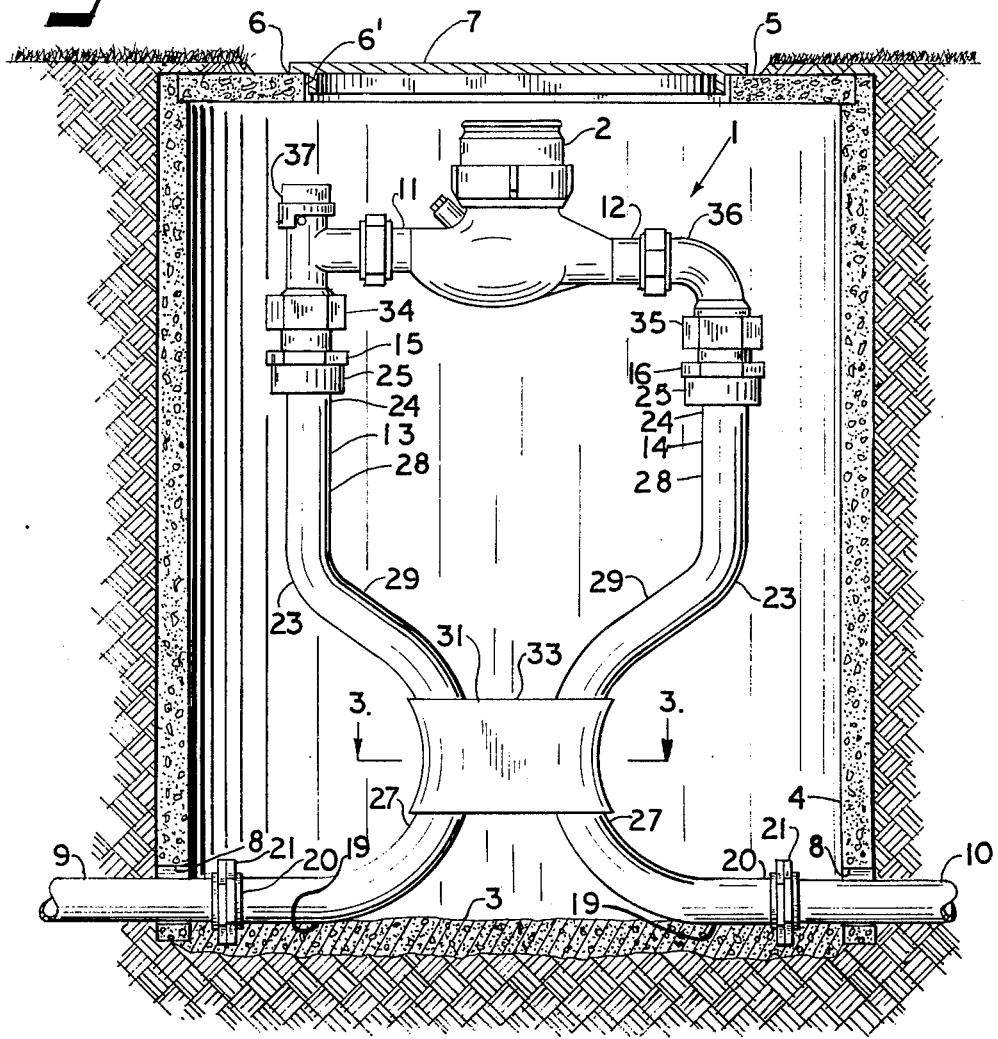
FIG. 1 is a side elevation view of a meter setting device shown installed in an underground meter box with portions of the meter box broken away to show structural details of the meter setter.

Referring more in detail to the drawings.

As required, detailed embodiments of the present invention are disclosed herein, however, it is to be understood that the disclosed embodiments are merely exemplary of the invention which may be embodied in various forms. Therefore, specific structural and functual details disclosed herein are not to be interpreted as limiting but merely as a basis for the claims and as a representative basis for teaching one skilled in the art to variously employ the present invention in virtually any appropriate detailed structure.

The reference numeral 1 designates generally a meter setter adapted to support a meter 2 such as a utility meter spaced above a support surface 3. By way of environment, the meter setter 1 and meter 2 are positioned within a meter box 4 which is buried in the ground and has an upper end 5 with a closure structure 6 having a removable cover 7 generally flush with the ground and closing an access opening 6'. Removal of the cover 7 permits access into the interior of the meter box 4 for servicing the meter and reading same. The ground on other material at the lower end of the meter box 4 provides the support surface 3 and forms the bottom of the meter box chamber. Openings 8 extend through the side wall of meter box 4 so that flow conduit or pipe portions 9 and 10 can extend into the interior of the meter box 4.

Figure 2:
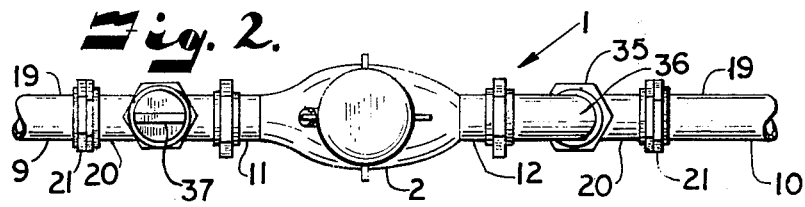
FIG. 2 is a plan view of the meter setting device shown in FIG. 1.

The meter 2 is of generally standard construction having an inlet 11 and outlet 12. The meter 2 in the form of the invention illustrated in FIG. 1 and FIG. 2 is connected to inlet and outlet pipes 13 and 14 by suitable pipe fittings such as unions 15 and 16 respectively, and is supported thereby. The inlet pipe 13 and outlet pipe 14 are suitably connected to the conduits 9 and 10 respectively and form a flow path therebetween.

In the illustrated structure, the inlet and outlet pipes 13 and 14 are similar in construction wherein like numbers designate like or similar parts or structure, with the description of the inlet pipe 13 also applying generally to the outlet pipe 14. The inlet pipe 13 has a generally horizontally disposed foot forming portion 19 having a free end 20 which in use is connected to the conduit 9 by a suitable pipe fitting such as a union 21. A generally vertically disposed or upstanding leg forming portion 23 extends from the horizontal portion 19 to the connections of the meter 2. The upstanding portion 23 and horizontal portion are in a single vertical plane with a free upper end 24 having a fitting 25, a part of the union 15, secured thereto. As shown, the pipe 13 has a large radius curved portion extending upwardly from the horizontal position in a reverse bend portion 27 and then is curved upwardly as 29 ending in the vertical portion 28 having the free end 24. As described above, the outlet pipe 14 is similar in construction to the inlet pipe 13, wherein the fitting 25 secured to the end 24 is part of the union 16. The end 20 of the horizontal portion 19 is connected to the conduit 10 by a pipe fitting such as the union 21, and is remote from end 20 of the inlet pipe 13.

A connecting device or coupling 31 is secured to adjacent portions of the inlet and outlet pipes 13 and 14 so that same are in the form of a unitary and rigid structure. As shown, the connecting device 31 is comprised of a spacer 32 positioned between the curved intermediate portions 27 for holding same in spaced relation. A sleeve 33 extends around the intermediate portions 27 and the spacer 32 and is tensioned to tightly grip same and hold the vertical section 27 in firm engagement with the spacer 32 providing the rigid and unitary assembly of the inlet and outlet pipes 13 and 14 which are in generally coplanar relation. The sleeve 23 preferably is of a synthetic resin material such as polyvinyl chloride which will shrink upon application of heat thereto and in assembling the apparatus the sleeve is sleeved over the pipe portions, the spacer inserted and then heat is applied to the sleeve shrinking it into a tight gripping relation, forming a rigid structure.

The meter 2 is connected to the inlet and outlet pipes 13 and 14 for mounting same on the meter setter 1. As shown, couplings 34 and 35, which are part of the respective union 15 and 16, are secured to the inlet 11 and outlet 12 respectively. The couplings 34 and 35 are connected to the respective fitting 25 such as by threaded engagement. The union 16 includes an elbow 36 to eliminate the need for another bend in the outlet pipe 14 to effect connection between same and the meter 2. Preferably a shutoff valve 37 is connected in either the inlet pipe 13 or outlet pipe 14 so that the flow of fluid can be selectively shut off. As shown, the valve 37 is connected in the inlet pipe 13 and positioned between coupling 34 and the inlet 11 with the valve preferably forming an elbow to eliminate the need for an extra bend in the inlet pipe 13 to effect connection between same and the meter 2.

In use, the meter setter 1 has the horizontal portions 19 in generally parallel relation and in engagement with the support surface 3 acting as feet for support of the meter 2. The inlet and outlet pipes 13 and 14 respectively are connected to the conduits 9 and 10 respectively with the unions 21 and preferably are of resilient plastic material such as polyvinyl chloride usuable for water under pressure. Although the inlet and outlet pipes 13 and 14 are in a rigid and unitary structure by use of the connecting device 31, the resiliency of the material compensates for expansion and contraction of the conduits 9 and 10. It is to be further noted that the meter 2 is positioned relative to the horizontal portion 19 whereby same is balanced so as to reduce or to eliminate a bending movement or torque applied to the connection the conduits 9 and 10 and the inlet and outlet pipes 13 and 14, preventing separation at the connections thereof. A stake (not shown) may be used to further help prevent movement of the meter 2.

Figure 4:
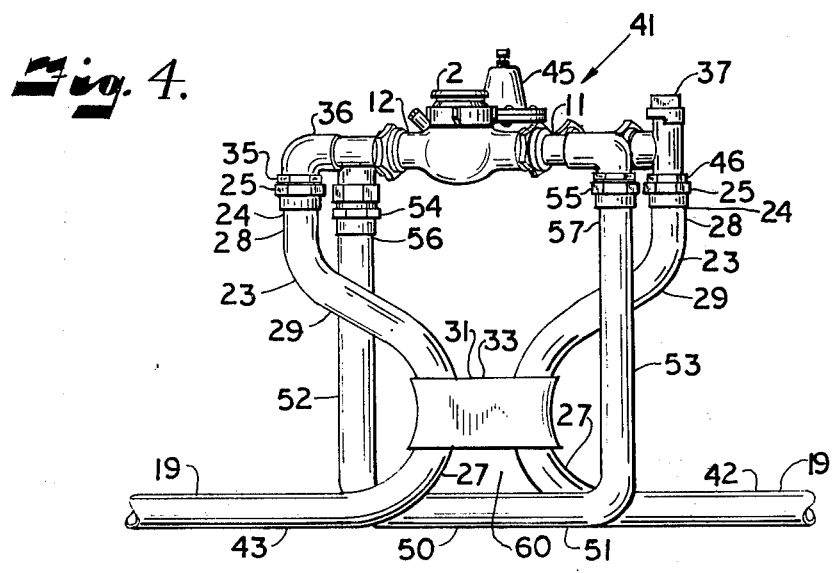
FIG. 4 is a side elevation view of the modified form of meter setting device for use with a meter and pressure regulator connected in series.
Figure 5:
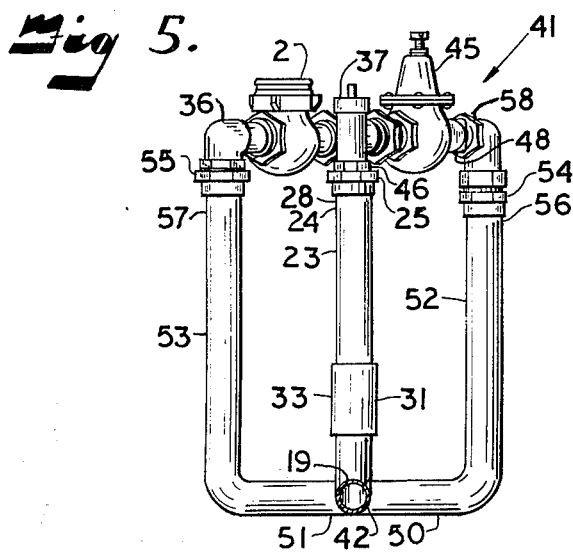
FIG. 5 is an end elevation of the modified form of meter setting device shown in FIG. 4.
Figure 6:
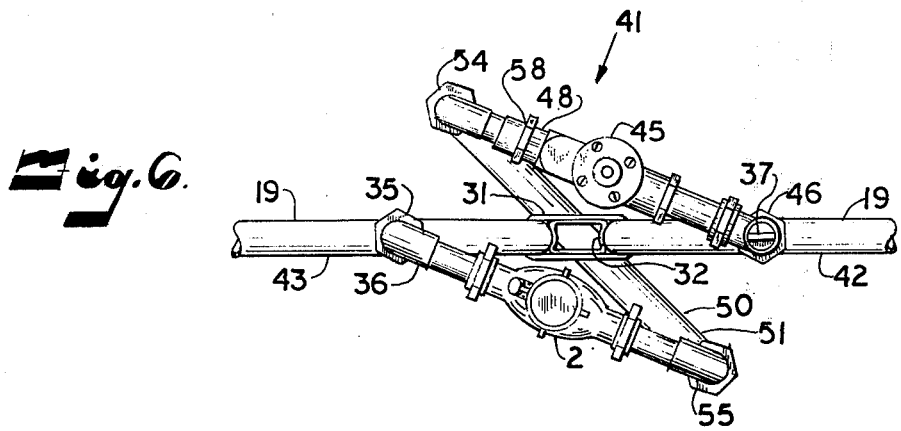
FIG. 6 is a plan view of the modified form of meter setting device shown in FIG. 4.

FIG. 4 to FIG. 6 inclusive illustrate a modified form of meter setter which is indicated generally by the reference numeral 41 and has portions similar in construction to the meter setter 1 wherein like numbers designate like or similar parts or structure. The meter setter 41 includes inlet and outlet pipes 42 and 43 similar to the inlet and outlet pipes 13 and 14 and which are secured together in a rigid and unitary assembly by the connector 31. The horizontal portions 19 are connected to the conduit 9 and 10 by the unions 21. A flow device such as a pressure regulator 45 is suitably connected in a series with the meter 2 so as to control the pressure of the fluid supplied to the conduit 10. In the illustrated structure the pressure regulator 45 is upstream of the meter 2 and is connected to the inlet pipe 42 by a coupling 46 which has the fitting 25 as a part thereof. The outlet 12 of the meter 2 is connected to the outlet pipe 43 by the coupling 35.

The inlet 11 of the meter 2 and an outlet 48 of the pressure regulator 45 are connected by a crossover pipe 50 to form a flow path therebetween. As shown, the crossover pipe 50 has a bight portion 51 and two upstanding portions 52 and 53 with couplings 54 and 55 secured to free ends 56 and 57 thereof. The fitting 54 is connected to the outlet 48 by a coupling 58 and the fitting 55 is connected to the inlet 11 of the meter 2 by the coupling 34. As shown, the connecting device 31 is spaced above the support surface 3 and partially defines an opening extending between opposite sides of the inlet and outlet pipes 13 and 14 whereby the bight 51 extends through the opening 60. The bight 51 serves as a foot and engages the support surface 3 to provide support for the regulator 45 and meter 2.

Figure 3:
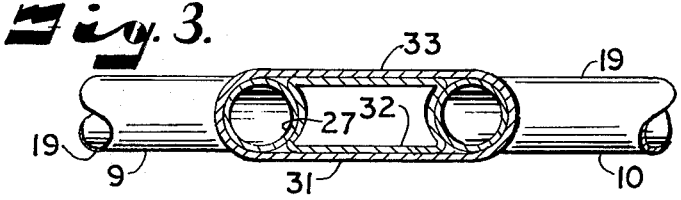
FIG. 3 is an enlarged section view of a connecting device taken along the line 3—3, FIG. 1.

The bight 51 is disposed at an angle to the axes of the horizontal portions 19 to provide bi-axial support for the regulator 45 and meter 2 to reduce or eliminate the bending moments or torque applied to the connection between the inlet and outlet pipes 13 and 14 and the conduits 9 and 10. As in the meter setter 1, the ends 24 in the meter setter 41 are positioned vertically above the axis of the respective horizontal portion 19 and the ends 56 and 57 of the upstanding portions 52 and 53 are also positioned vertically above the axis of the bight 51 so that weight of the regulator 35 and the meter 2 is supported in a position to minimize or eliminate offbalance loading and resulting torque. As described above, for the form of meter setter shown in FIG. 1, FIG. 2 and FIG. 3, the inlet and outlet pipes 13 and 14 and the crossover pipe 15 in the meter setter 41 are of a resilient plastic material, such as polyvinyl chloride to help compensate for expansion and contraction of the conduits 9 and 10. A valve 37 is connected between the inlet pipe 13 and the regulator 45 so that flow of fluid can be shut off.

It is to be understood that while I have illustrated and described certain forms of my invention, it is not to be limited to the specific form or arrangement of parts herein described and shown.

What I claim and desire to secure by Letters Patent is:

1. Meter setter apparatus for supporting a utility meter in a meter box and connecting said meter in a service system comprising:
   a. inlet and outlet pipe members with each having first straight portions in substantially axial alignment and with remote ends having fittings for connection to supply and sevice lines, adjacent portions of each of said first straight portions of the pipe members being curved upwardly in a generally reverse bend and terminating in a further bend and second straight portion extending away from and substantially normal to said first straight portion, said first and second straight portions of the pipe members being in a single plane;
   b. said second straight portions of the pipe members having free ends that are spaced apart with meter connecting fittings on said free ends for connection with meter fittings to position a meter above and between said free ends;
   c. said reverse curved portions of the pipe members having intermediate adjacent portions;

d. a spacer member between and engaged with said intermediate portions;

e. a sleeve member extending around the intermediate portions of the pipe members and spacer member and tensioned to securely clamp same together in a rigid unitary assembly holding said pipe members in coplanar relation whereby said first straight portions act as feet with said assembly serving as the sole support of a meter connected to the fittings on the free ends of the second straight portions.

2. The apparatus as set forth in claim 1 wherein:

a. said pipe members being of a resilient plastic material;

b. said spacer being of a resilient plastic material;

c. said sleeve being of a heat shrinkable resilient plastic material and tightly gripping the intermediate portions upon application of heat thereto to tension same.

3. The apparatus as set forth in claim 2 wherein:

a. said second straight portions being positioned above the longitudinal axis of the respective said first straight portion and being generally vertically disposed with said meter being positioned substantially in line with the longitudinal axes of the first straight portions.

4. The meter setter as set forth in claim 2 including:

a. a flow device for operating in series with said meter;

b. said spacer and sleeve being spaced above said first straight portions and cooperating with lower portions of the reverse curved portions of the inlet and outlet pipe members to define an opening extending therebetween;

c. means connecting the flow device in series with the meter including a conduit of resilient plastic material and having a bight portion forming a second foot portion and extending through said opening to cooperate with the inlet and outlet pipe members in supporting said meter and flow device and having upstanding portions with free ends, one upstanding portion free end being connected to said flow device and the other upstanding portion free end being connected to said meter;

d. said meter being also connected to one of the second straight portion free ends and said flow device being also connected to the other said second straight portion free end whereby said flow device, meter and conduit form a flow path between said inlet and outlet pipe members.

5. The meter setter as set forth in claim 4 wherein:

a. said bight being angularly disposed to said first straight portions for biaxial support of said meter and flow device on said first straight portions and said bight.

6. The meter setter as set forth in claim 5 wherein:

a. said second straight portions free ends being positioned generally above the longitudinal axis of the respective first straight portion and said second straight portions being generally vertically disposed;

b. said upstanding portions free ends being positioned generally above the longitudinal axis of the bight portion with said upstanding portions generally vertically disposed.

* * * * *